Sept. 7, 1937. S. W. BRIGGS 2,092,548
OIL FILTER AND CARTRIDGE THEREFOR
Filed May 23, 1935
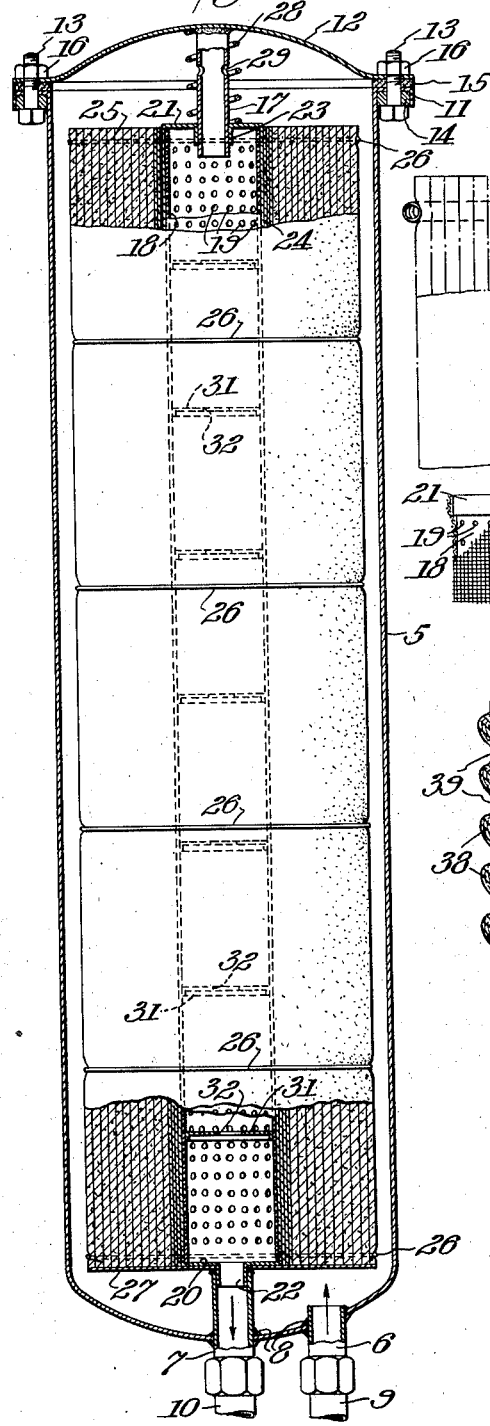
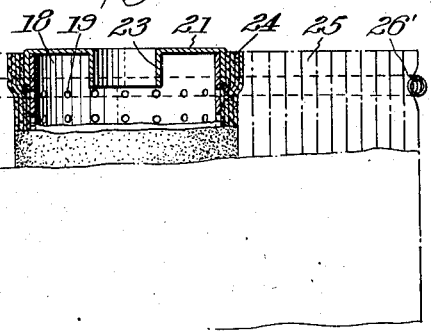
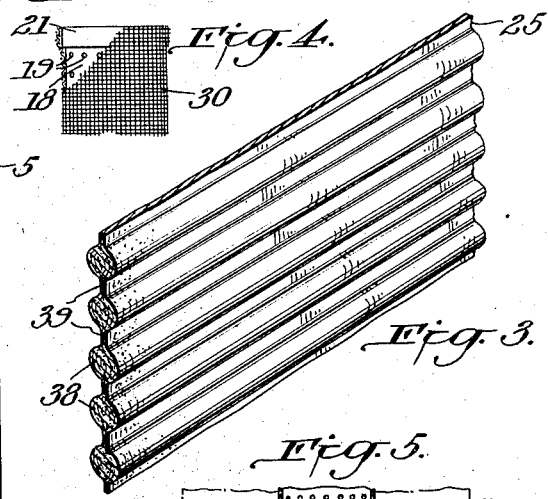
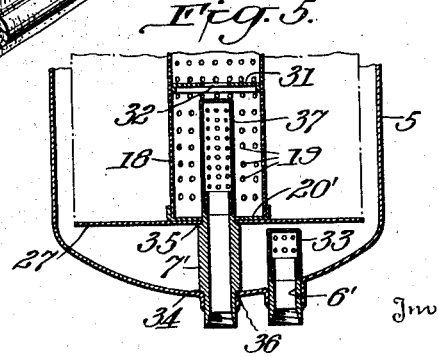
Inventor
Southwick W. Briggs
By Potter, Pierce & Scheffler
his Attorneys Patented Sept. 7, 1937

2,092,548

UNITED STATES PATENT OFFICE 2,092,548

OIL FILTER AND CARTRIDGE THEREFOR

Southwick W. Briggs, Washington, D. C.

Application May 23, 1935, Serial No. 23,099

11 Claims. (Cl. 210—183)

This invention relates to the filtering art, and is concerned more particularly with the provision of an oil filter employing as the filtering medium a filtering body composed of laminae of corrugated cellulose wadding. The employment of the latter material as a filtering medium, broadly, is considered to be one aspect of the invention.

It is an object of the present invention to provide a filter comprising a casing and a readily replaceable filter cartridge therefor. Another object of the invention is to provide a novel filtering medium for an oil filter. Other objects include the provision of an efficient yet cheap, readily renewable, filter cartridge for the oil filter of an automotive or aeronautical or like engine.

The foregoing, and other, objects of invention are realized by the filter of the present invention, which filter comprises, in combination with a filter casing provided with inlet and outlet passages for liquid and carrying within it, at opposite ends thereof, tubular projections one of which is in communication with the aforesaid outlet passage, a readily replaceable filter cartridge spaced from the ends and side wall of the filter casing and held in operating position by means of the aforesaid tubular projections, said cartridge including, as the filtering medium, a laminated body composed of a plurality of laminae of corrugated or corduroyed cellulose wadding. A preferred embodiment of the invention is an oil filter for airplanes combining very light weight with improved filtering efficiency.

"Cellulose wadding" is the name applied to a fibrous material composed of a plurality of superimposed extremely thin, gauze-like, webs of loosely interlaced cellulose fibers (i. e., cellulose fibers obtained from wood or like vegetable matter by a process of chemical digestion of the raw cellulose-containing material with chemicals adapted to dissolve or render soluble the non-cellulosic constituents of said material, with subsequent removal of the so-solubilized non-cellulosic constituents from the so-released cellulose fibers). The individual webs are produced by applying a film of low density aqueous cellulose pulp suspension to the surface of a drying roll, driving off the water, and removing from the drying roll the resulting "cobweb" of fibers as a tissue, and the wadding is produced by superimposing on each other a plurality (e. g., twelve) of such gossamer webs. This same material, in a body containing more laminae, is sometimes called "crepe wadding".

The high permeability and adsorptiveness of cellulose wadding already are known. It is, however, likewise known that said material is of such loose construction, and is so readily softened by water, that it is not in its normal form operative as a filtering material for use in filtering under pressure a liquid containing water: when, for instance, oil containing some water is pressed against the wadding the latter is softened by the water, sags, becomes "mushy", and ceases to be permeable unless somehow supported mechanically between layers.

I have found that the above disadvantages are in large part avoided by compressing and corduroying the cellulose wadding: this treatment transforms the wadding into a mass which, while not having the over-all density of blotting paper, does have sufficient "body" or strength to resist sagging and "mushing" and which needs no mechanical support between layers for filtering water-containing oil under pressure. Accordingly, in making use of cellulose wadding as a filtering medium I compress the same between plates provided with corduroying profiles. Preferably, I so compress a 12-ply cellulose wadding under sufficient pressure to reduce the apparent thickness of the wadding from an original thickness of about $\frac{1}{4}$ inch to about $\frac{1}{8}$ inch at the corrugations and to about $\frac{1}{64}$ inch between corrugations, the corrugations being about $\frac{1}{8}$ inch wide and spaced apart about $\frac{1}{16}$ inch. Each of these data are, of course, variable. Such corduroying, incidentally, increases the surface area of the wadding by, roughly, about 150%. The resulting material is an advantageous filtering medium for oil filtration, and especially so for use in an airplane oil filter.

The following are some of the necessary, or at least desirable, features of an oil filter for airplanes:

1. Light weight;
2. Maximum filtering capacity;
3. Operable in all positions;
4. Constant filtering rate regardless of change in position; and
5. Retention of precipitate by the filtering medium under sudden and repeated fluctuations of oil pressure.

Relative to the fifth of the above features, it may be pointed out that a laminated body of the aforesaid corduroyed or corrugated cellulose wadding has a far better precipitate-removing and precipitate-retaining efficiency than does either cotton waste or blotting paper, or the cellulose wadding in non-corduroyed form. This fact appears from the following comparative data, taken on a lubricating oil containing 3% of suspended solids (mainly carbon):

| Filtering medium | Amount used by weight | Percentage of solids in oil after passing medium | Solids freed from medium by fluctuation in oil pressure from 60 lbs. to 20 lbs. |
| --- | --- | --- | --- |
| 12-ply cellulose wadding. | 200 grams. | 1% | 0.5%. |
| Cotton waste | 300 grams. | 0.5% | About 0.25%. |
| Corduroyed 12-ply cellulose wadding. | 200 grams. | Trace | None. |

Directly comparing the precipitate-removing efficiencies of cotton waste ("Grade A") and corduroyed 12-ply cellulose wadding, it may be stated that 420 grams of the waste were required to equal the efficiency of 200 grams of the corduroyed wadding. Moreover, the cotton waste, as noted above, releases a material amount of the removed solids upon sudden fluctuation in oil pressure from, say, 60 pounds, to say, 20 pounds.

Another distinguishing characteristic of compressed and corrugated cellulose wadding over cotton waste, wool and other fibrous filtering media is that it satisfactorily removes carbon from oil at a temperature not materially above normal room temperature, e. g., about 70 to 80° F.

The invention hereinafter will be described more particularly with reference to the accompanying drawing which illustrates one specific embodiment of the same.

In the drawing

Fig. 1 is a central longitudinal sectional view of a filter unit embodying the invention, the filter cartridge being shown partly in elevation and partly in section;

Fig. 2 is an enlarged detail view of one end of the filter cartridge with the outer wrapping partly broken away and some of the parts in section;

Fig. 3 is an enlarged detail view of a piece of the filter material employed in the invention;

Fig. 4 is a fragmentary view showing a modified construction, and

Fig. 5 is a fragmentary sectional view illustrating a modified form of the invention.

Referring now more particularly to Fig. 1, the filter unit is composed of a cylindrical casing 5 which in the preferred embodiment is made of sheet aluminum of about $\frac{1}{16}$ inch in thickness and has one closed end and one open end. The closed end of the casing is provided with inlet and outlet pipes 6 and 7, respectively, these pipes extending through the wall of the casing and being welded thereto as indicated at 8. Conduit 9 which represents an oil line under pressure, and conduit 10 leading back to an oil reservoir (not shown), are connected to the pipes 6 and 7, respectively. The outlet pipe 7 is located axially of the casing 5 and extends a short distance into the casing for a purpose to be presently described.

The open end of the casing 5 is formed with a bolt flange 11 to which the cover 12 is screwed by means of the bolts 13 located at suitably spaced intervals. In order to strengthen the end of the casing, a stiffening ring 14 of steel or the like is inserted between the heads of the bolts 13 and the flange 11. A fiber sealing ring 15 is also located between the flange and the cover, the bolt holes formed in the sealing ring being made smaller than the diameter of the bolts 13 so that the bolts will be frictionally retained in position even though the nuts 16 become loosened or lost.

The cover 12 of the filter casing is provided with a hollow stud 17 which is located axially of the casing and extends into the same a substantial distance. This stud may be secured to the inner face of the cover by welding.

The filter cartridge comprises a permeable core member in the form of a hollow cylinder 18 formed of foraminous, e. g., perforated, sheet metal, e. g., steel of about 30 gauge, there being a large number of perforations 19 for the passage of fluid laterally into the core. Preferably, the perforations are of about $\frac{3}{32}$ inch in diameter. The ends of the perforated cylinder 18 are closed by end caps 20 and 21 which may be soldered or otherwise fixed in place on the cylinder. The end cap 20 is formed with an axially projecting neck portion 22 which has a sliding fit into the inner end of the outlet pipe 7. The centrally apertured oil-spreading and core-supporting disc 27 is fixed to the cap 20 as by soldering: its aperture just passes the neck 22. It has a diameter substantially equivalent to that of the filtering body, and serves to spread the stream of incoming oil and to protect the end of the filtering body. The cap 21 is formed with an axial opening defined by the inturned flange 23 which latter is of such diameter as to make a sliding fit on the hollow stud 17 of the cover 12. It will thus be seen that due to the axial placement of the outlet pipe 7 and the stud 17 the filter cartridge will be automatically centered in the casing.

In the form of the invention shown in Fig. 1, the filter cartridge is built up by first wrapping one, or several, layers of cotton flannel around the core 18, this flannel layer being indicated at 24 on the drawing. Next a suitable number of layers of corrugated cellulose wadding 25 are wrapped over the flannel base 24 to form a laminated filter body. The corrugated cellulose wadding body may be as thick as desired for the type of work to be performed by the filter. The corrugated cellulose wadding layers, which are wound from a continuous strip, are held against unwinding by a plurality of retaining members 26, which may be positioned over the outside of the body at appropriate distances therealong: as such members I prefer to use endless helical springs as shown at 26' in Fig. 2, although, as is illustrated in Fig. 1, the body may be retained by wires as at 26.

According to the preferred embodiment, for a cartridge of about 18 inches length I employ a perforated core of that length and having a diameter of about 1.5 inches; the over-all thickness of the cartridge is about 4.5 inches; and the casing has an inside diameter of about 5 inches, thus leaving a clearance between the cartridge and the casing of about .25 inch.

To mount the cartridge, the same is introduced endwise into the casing 5 until the neck 22 seats in the inner end of the pipe 7. The casing top 12 is then applied with the hollow stud 17 sliding into the bearing provided by the annular flange 23 of the cap 21. A coil spring 28 is mounted between cover 12 and the cap 21 surrounding the stud 17 to hold the cartridge firmly into engagement with the outlet pipe 7 regardless of the position of the filter. The spreader disc 27 protects the end of the filter cartridge against the force of the oil entering through the pipe 6 and spreads the stream out so that the oil rises all around the cartridge. It prevents passage of oil through the ends of the laminae and thence through core 18.

In order to relieve excessive pressure in the casing when the oil is cold and thus flows less freely through the filtering medium, a hole 29, about No. 40 size, is formed through the wall of the tubular stud 17 affording a passage into the interior of the cylinder and thence out through the pipe 7 without passing through the filtering body. While this hole relieves pressure in the casing, it is not large enough to effect the efficient operation of the filter in normal use.

In the modified form of the invention shown in Fig. 4, the cotton flannel 24 is replaced by a lamina 30 of fine wire mesh, e. g., 100-mesh wire screen. An advantage of the wire mesh is that it holds the corrugated cellulose wadding away from the holes in the core and thus prevents the latter being closed by cellulose wadding, while at the same time stiffening the entire structure of the cartridge.

For large capacity filters, and/or for filters adapted to be operated under heavy pressure, I prefer to strengthen the core 18 of the cartridge against compression by means of a plurality of reinforcing or bracing elements, preferably in the form of flanged discs 31, as shown in Figs. 1 and 5, soldered or otherwise fixed to the interior surface of the core at a plurality of points therealong: the bracing elements have openings, e. g., central openings, 32 of a diameter at least as great as is the inner diameter of conduit 7.

In the modification illustrated in Fig. 5, that end of the inlet pipe 6' which protrudes into the casing 5 is provided with internal threads for the reception of a strainer element in the form of a thimble 33: the latter, preferably constructed of aluminum, contains a plurality of perforations, e. g., size No. 60 drill holes sufficient in number to permit ready discharge of oil into the casing. Outlet pipe 7' is formed with thick walls which are reduced adjacent the ends to provide shoulders 34 and 35. The shoulder 34 abuts the inner side of an axial outlet opening 36 formed in the end wall of casing 5, the reduced end protruding from the casing for attachment to a conduit not shown. The shoulder 35 provides a stop for the spreader disc 27 of the cartridge, the reduced inner end of the pipe 7' extending into the interior of the core 18 and being interiorly threaded for the reception of a strainer element 37 similar generally to strainer element 33. In this modification, the end cap 20' lacks the projecting neck portion of the otherwise similar end cap 20 of Fig. 1.

In Fig. 3, the corrugations of the compressed and corrugated or corduroyed cellulose wadding are represented at 38, the compressed ribs between corrugations being represented at 39.

It may be noted that on actual comparative test of the filter described and claimed herein, for filtering the oil of a double-row radial airplane engine capable of developing in excess of 700 horse power and having a 20 gallon oil tank capacity, the engine being operated at full load for a continuous run of 20 hours, the oil at the end of the run was visually clear, contained only a trace of solids and could have been used without further treatment for a longer period; whereas, in the check test made without the filter the oil, after the 20-hour run, contained 2% of solids and therefore was no longer usable.

As will be appreciated, the present invention is not restricted to the particular specific embodiment illustrated in the drawing. The di-mensions and configuration of the filter cartridge, the dimensions and configuration of the filter casing, the location of the inlet and outlet passages of the filter casing, the exact means for closing the filter casing, the exact dimensions and configuration of the filter medium, and other details are considered to be matters of design and expediency only.

I claim:

1. In an oil filter the combination with a casing having inlet and outlet passages, of a replaceable filter cartridge therein spaced from the ends and side wall thereof, said cartridge comprising a foraminous core carrying a filtering body consisting essentially of a plurality of layers of compressed and corrugated cellulose wadding, said core having one end thereof in communication with one of said passages.

2. An oil filter comprising, in combination, a substantially cylindrical casing having inlet and outlet passages and provided with a detachable head and with tubular projections at opposite ends thereof, one of which projections is in communication with said outlet passage and the other of which is fixed within the head of the casing; and a replaceable filter cartridge spaced apart from the ends and side wall of the casing and held in position therein by said projections, said cartridge comprising a perforated hollow core carrying on its perforated surface at least one layer of permeable material having interstices smaller than the perforations of said core which permeable material is covered by a plurality of layers of compressed and corrugated cellulose wadding, the ends of said core bearing caps each of which is provided with an opening cooperating with one of said tubular projections.

3. The invention defined in claim 2, characterized in that the core cap adjacent the tubular projection which communicates with the outlet passage of the casing is provided with a tubular outlet adapted to make a sliding fit with said tubular projection, and in that the other core cap is provided with an opening adapted to receive the tubular projection which is fixed within the head of the casing.

4. The invention defined in claim 2, characterized in that the tubular projection which is fixed within the head of the casing is provided with an opening through the wall thereof intermediate its ends.

5. The invention defined in claim 2, in which a spring surrounding the tubular projection fixed to the head of the casing is compressed between the latter and one end of the cartridge whereby the other end of the cartridge is pressed against the tubular projection which communicates with the outlet passage of the casing.

6. The invention defined in claim 2, characterized in that in the inner end of the tubular projection remote from the casing head is fixed a perforated thimble.

7. The invention defined in claim 2, characterized in that in the inner end of the tubular projection remote from the casing head and in the inner end of the inlet passage are fixed perforated thimbles.

8. The invention defined in claim 2, characterized in that the covering of layers of compressed and corrugated cellulose wadding is held in place by means of a plurality of endless springs.

9. A filtering unit adapted to be inserted in a filter apparatus, comprising a foraminous core carrying a plurality of layers of compressed and corrugated cellulose wadding, at least one end of said core being closed by a cap provided with an opening.

10. The filtering element defined in claim 9, characterized in that the covering of layers of cellulose wadding is held in place by means of a plurality of endless springs.

11. A filtering unit adapted to be inserted in a filter apparatus, comprising a foraminous core carrying a plurality of layers of compressed and corrugated cellulose wadding.

SOUTHWICK W. BRIGGS.